United States Patent
Tenghamn

(10) Patent No.: US 8,094,514 B2
(45) Date of Patent: *Jan. 10, 2012

(54) SEISMIC VIBRATOR ARRAY AND METHOD FOR USING

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 161 days.

This patent is subject to a terminal disclaimer.

(21) Appl. No.: 12/291,196

(22) Filed: Nov. 7, 2008

(65) Prior Publication Data

US 2010/0118646 A1    May 13, 2010

(51) Int. Cl.
    *G01V 1/38* (2006.01)
(52) U.S. Cl. .................. 367/23; 181/110; 181/111
(58) Field of Classification Search .......... 367/23; 181/110, 111, 118
    See application file for complete search history.

(56) References Cited

U.S. PATENT DOCUMENTS

| | | | |
|---|---|---|---|
| 3,258,738 A | 6/1966 | Merchant | |
| 3,886,493 A | 5/1975 | Farr | |
| 4,049,077 A | 9/1977 | Mifsud | |
| 4,159,463 A * | 6/1979 | Silverman | 367/59 |
| 4,420,826 A | 12/1983 | Marshall, Jr. et al. | |
| 4,633,970 A | 1/1987 | Mifsud | |
| 4,706,230 A | 11/1987 | Inoue et al. | |
| 4,715,020 A * | 12/1987 | Landrum, Jr. | 367/38 |
| 4,780,856 A * | 10/1988 | Becquey | 367/23 |
| 4,823,326 A * | 4/1989 | Ward | 367/41 |
| 4,926,392 A | 5/1990 | Handley et al. | |
| 4,941,202 A | 7/1990 | Upton | |
| 4,969,129 A * | 11/1990 | Currie | 367/41 |
| 5,126,979 A | 6/1992 | Rowe, Jr. et al. | |
| 5,329,499 A | 7/1994 | Molund et al. | |
| 5,375,101 A | 12/1994 | Wolfe et al. | |
| 5,457,752 A | 10/1995 | Engdahl et al. | |
| 5,546,361 A | 8/1996 | Boucher et al. | |
| 5,721,710 A | 2/1998 | Sallas et al. | |
| 5,757,726 A | 5/1998 | Tenghamn et al. | |
| 5,757,728 A | 5/1998 | Tenghamn et al. | |
| 5,959,939 A | 9/1999 | Tengham et al. | |
| 6,035,257 A | 3/2000 | Epperson | |
| 6,041,888 A | 3/2000 | Tenghamn | |
| 6,076,629 A | 6/2000 | Tenghamn | |
| 6,076,630 A | 6/2000 | Ambs | |
| 6,085,862 A | 7/2000 | Tenghamn | |
| 6,488,117 B1 | 12/2002 | Owen | |
| 6,545,944 B2 * | 4/2003 | de Kok | 367/56 |

(Continued)

FOREIGN PATENT DOCUMENTS

EA    003029    2/2002

(Continued)

OTHER PUBLICATIONS

R. Gold, "Optimal Binary Sequences for Spread spectrum Multiplexing", (1967), IEEE Transactions on Information Theory, vol. IT-13, No. 4, pp. 619-621.

(Continued)

*Primary Examiner* — Ian Lobo

(57) ABSTRACT

A method for generating seismic energy for subsurface surveying includes operating a first seismic vibrator and operating at least a second seismic vibrator substantially contemporaneously with the operating the first seismic vibrator. A driver signal to each of the first and the at least a second seismic vibrators that are substantially uncorrelated with each other.

10 Claims, 11 Drawing Sheets

U.S. PATENT DOCUMENTS

| | | | |
|---|---|---|---|
| 6,704,245 B2 * | 3/2004 | Becquey | 367/39 |
| 6,711,097 B1 | 3/2004 | Engdahl | |
| 6,766,256 B2 * | 7/2004 | Jeffryes | 702/17 |
| 6,851,511 B2 | 2/2005 | Tenghamn | |
| 7,167,412 B2 | 1/2007 | Tenghamn | |
| 7,257,049 B1 | 8/2007 | Laws et al. | |
| 7,327,633 B2 | 2/2008 | Bagaini et al. | |
| 7,376,045 B2 * | 5/2008 | Falkenberg et al. | 367/19 |
| 7,515,505 B2 * | 4/2009 | Krohn et al. | 367/49 |
| 7,551,518 B1 | 6/2009 | Tenghamn | |
| 7,620,193 B2 | 11/2009 | Metheringham et al. | |
| 7,881,158 B2 | 2/2011 | Tenghamn | |
| 2003/0221901 A1 * | 12/2003 | Tenghamn | 181/121 |
| 2009/0010103 A1 * | 1/2009 | Sallas et al. | 367/41 |
| 2009/0245019 A1 * | 10/2009 | Falkenberg et al. | 367/17 |
| 2009/0321175 A1 | 12/2009 | Tenghamn | |
| 2010/0118646 A1 | 5/2010 | Tenghamn | |
| 2010/0118647 A1 | 5/2010 | Tenghamn | |
| 2010/0322028 A1 | 12/2010 | Tenghamn | |
| 2011/0038225 A1 | 2/2011 | Tenghamn | |

FOREIGN PATENT DOCUMENTS

| | | |
|---|---|---|
| EA | 003029 | 12/2002 |
| EA | 008398 | 8/2006 |
| EA | 008398 | 4/2007 |
| RU | 1056100 | 11/1983 |
| RU | 2 045 079 | 9/1995 |
| RU | 2045079 | 9/1995 |
| RU | 2 126 983 | 2/1999 |
| RU | 2126983 | 2/1999 |
| WO | 2010002431 A1 | 1/2010 |
| WO | 2010037937 A1 | 4/2010 |

OTHER PUBLICATIONS

Esmael H. Dinan, Bijan Jabbari, "Spreading Codes for Direct Sequence CDMA and Wideband CDMA Cellular Networks", (1998), IEEE Communications Magazine, pp. 48-54.

Authorized Officer, L.I. Popova, Eurasian Patent Office Search Report, Feb. 8, 2010.

Murphy, Daniel L, Office Action for U.S. Appl. No. 12/291,221, Date Mailed: Nov. 22, 2010.

Rune Tenghamn, An Electrical Marine Vibrator with a Flextensional Shell, Exploration Geophysics. 2006, vol. 37, No. 4.

Data Sheet Terfenol-D.

H. A. J. Rijnja, Low Frequency Projectors for Sound Under Water, Netherlands Organization for Applied Scientific Research, Jan. 1991, Report No. FEL-90-A268, The Hague, The Netherlands.

Feng Xia, Q. M. Zhang, Z. Y. Cheng, A Class IV Flextensional Device Based on Electrostrictive Poly(vinylidene fluoride-trifluoroethylene) Copolymer, Jun. 2003.

Stig Rune Lennart Tenghamn, An Electrical marine Vibrator with a Flextensional Shell, Exploration Geophysics, Dec. 2006, vol. 37, No. 4, Oxford, England.

European Search Report for Application No. 09172992.1-1240/ 2184618, Mailing Date: Sep. 29, 2011.

* cited by examiner

SEISMIC VIBRATOR ARRAY AND METHOD FOR USING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to geophysical exploration and in particular to a vibratory seismic source useful in geophysical exploration. More particularly, the invention relates to methods for using vibrators for marine seismic acquisition.

2. Background Art

Seismic energy sources, including vibrators, are used in geophysical exploration on land and in water covered areas of the Earth. Acoustic energy generated by such sources travels downwardly into the Earth, is reflected from reflecting interfaces in the subsurface and is detected by seismic receivers, typically hydrophones or geophones, on or near the Earth's surface or water surface.

In marine seismic surveying, a seismic energy source such as an air gun or an array of such air guns is towed near the surface of a body of water. An array of seismic receivers, such as hydrophones, is also towed in the water in the vicinity of the array of receivers. At selected times, the air gun or array of guns is actuated to release a burst of high pressure air or gas into the water. The burst of high pressure generates seismic energy for investigating geologic structures in the rock formations below the water bottom.

In marine seismic surveying, one type of seismic energy source is a vibrator. Generally, a seismic vibrator includes a base plate coupled to the water, a reactive mass, and hydraulic or other devices to cause vibration of the reactive mass and base plate. The vibrations are typically conducted through a range of frequencies in a pattern known as a "sweep" or "chirp." Signals detected by the seismic receivers are cross correlated with a signal from a sensor disposed proximate the base plate. The result of the cross correlation is a seismic signal that approximates what would have been detected by the seismic receivers if an impulsive type seismic energy source had been used. An advantage provided by using vibrators for imparting seismic energy into the subsurface is that the energy is distributed over time, so that effects on the environment are reduced as compared to the environmental effects caused by the use of impulsive sources.

It is not only the possible environmental benefits of using vibrators, that makes it desirable to adapt seismic vibrators to use in marine seismic surveying. By having a seismic energy source that can generate arbitrary types of signals there may be substantial benefit to using more "intelligent" seismic energy signals than conventional sweeps. Such a seismic energy source would be able to generate signals, have more of the characteristics of background noise and thus be more immune to interference from noise and at the same reduce their environmental impact. A practical limit to using marine vibrators for such sophisticated signal schemes is the structure of marine vibrators known in the art. In order to generate arbitrary signals in the seismic frequency band it is necessary to have a source which has a high efficiency to make the source controllable within the whole seismic frequency band of interest. Combining several marine vibrators that are individually controllable, with more sophisticated signal schemes would make it possible to generate seismic signals from several discrete sources at the same time that have a very low cross correlation, thereby making it possible to increase the efficiency acquiring seismic data. Hydraulic marine vibrators known in the art typically have a resonance frequency that is higher than the upper limit of ordinary seismic frequencies of interest. This means that the vibrator energy efficiency will be very low, principally at low frequencies but generally throughout the seismic frequency band, and such vibrators can be difficult to control with respect to signal type and frequency content. Conventional marine seismic vibrators are also subject to strong harmonic distortion, which limits the use of more complex signals. Such vibrator characteristics can be understood by examining the impedance for a low frequency vibrator.

The total impedance that will be experienced by a marine vibrator may be expressed as follows:

$$Z_r = R_r + jX_r \qquad \text{(Eq. 1)}$$

where: $Z_r$ is the total impedance, $R_r$ is the radiation impedance, and $X_r$ is the reactive impedance.

In an analysis of the energy transfer of a marine vibrator, the system including the vibrator and the water may be approximated as a baffled piston. The radiation impedance $R_r$ of a baffled piston can be expressed as:

$$R_r = \pi a^2 \rho_0 c R_1(x), \qquad \text{(Eq. 2)}$$

and the reactive impedance can be expressed as:

$$X_r = \pi a^2 \rho_0 c X_1(x) \qquad \text{(Eq. 3)}$$

where:

$$x = 2ka = \frac{4\pi a}{\lambda} = \frac{2\omega a}{c} \qquad \text{(Eq. 4)}$$

$$R_1(x) = 1 - \frac{2}{x} J_1(x) \qquad \text{(Eq. 5)}$$

$$X_1(x) = \frac{4}{\pi} \int_0^{\frac{\pi}{2}} \sin(x\cos\alpha)\sin^2\alpha \, d\alpha \qquad \text{(Eq. 6)}$$

in which $\rho_0$ is the density of water, $\omega$ is the angular frequency, k is the wave number, a is the radius of the piston, c is the acoustic velocity, $\lambda$ is the wave length, and $J_1$ is a Bessel function of the first order.

Applying the Taylor series expansion to the above equations provides the expressions:

$$R_1(x) = \frac{x^2}{2^2 1!2!} - \frac{x^4}{2^4 2!3!} + \ldots \qquad \text{(Eq. 7)}$$

$$X_1(x) = \frac{4}{\pi}\left[\frac{x}{3} - \frac{x^3}{3^2 \cdot 5} + \frac{x^5}{3^2 \cdot 5^2 \cdot 7} - \ldots\right] \qquad \text{(Eq. 8)}$$

For low frequencies, when x=2 ka is much smaller than 1, the real and imaginary part of the total impedance expression may be approximated with the first term of the Taylor series expansion. The expressions for low frequencies, when the wave length is much larger then the radius of the piston, become:

$$R_1(x) \to \frac{1}{2}(ka)^2 \quad \text{(Eq. 9)}$$

$$X_1(x) \to \frac{8ka}{3\pi} \quad \text{(Eq. 10)}$$

It follows that for low frequencies the radiation impedance R will be small as compared to the reactive impedance X, which suggests low efficiency signal generation. Accordingly, there is a need for efficient marine vibrators that can generate complex signals and there is a need to improve the time efficiency of operating seismic data acquisition to provide more economical operation and to minimize the environmental impact of marine seismic surveying.

SUMMARY OF THE INVENTION

A method for generating seismic energy for subsurface surveying according to one aspect of the invention includes operating a first seismic vibrator and operating at least a second seismic vibrator substantially contemporaneously with the operating the first seismic vibrator. A driver signal applied to each of the first and the at least a second seismic vibrators are substantially uncorrelated with each other.

A method for marine seismic surveying according to another aspect of the invention includes operating a first seismic vibrator in a body of water and operating at least a second seismic vibrator in the body of water substantially contemporaneously with the operating the first seismic vibrator. A driver signal is applied to each of the first and the at least a second seismic vibrators that are substantially uncorrelated with each other. Seismic signals are detected at each of a plurality of seismic receivers disposed at spaced apart locations. Portions of the detected seismic signals resulting from energy imparted into formations below the bottom of the body of water by each of the first and the at least a second seismic vibrator are determined.

Other aspects and advantages of the invention will be apparent from the description and the claims that follow.

DETAILED DESCRIPTION

Figure 1:
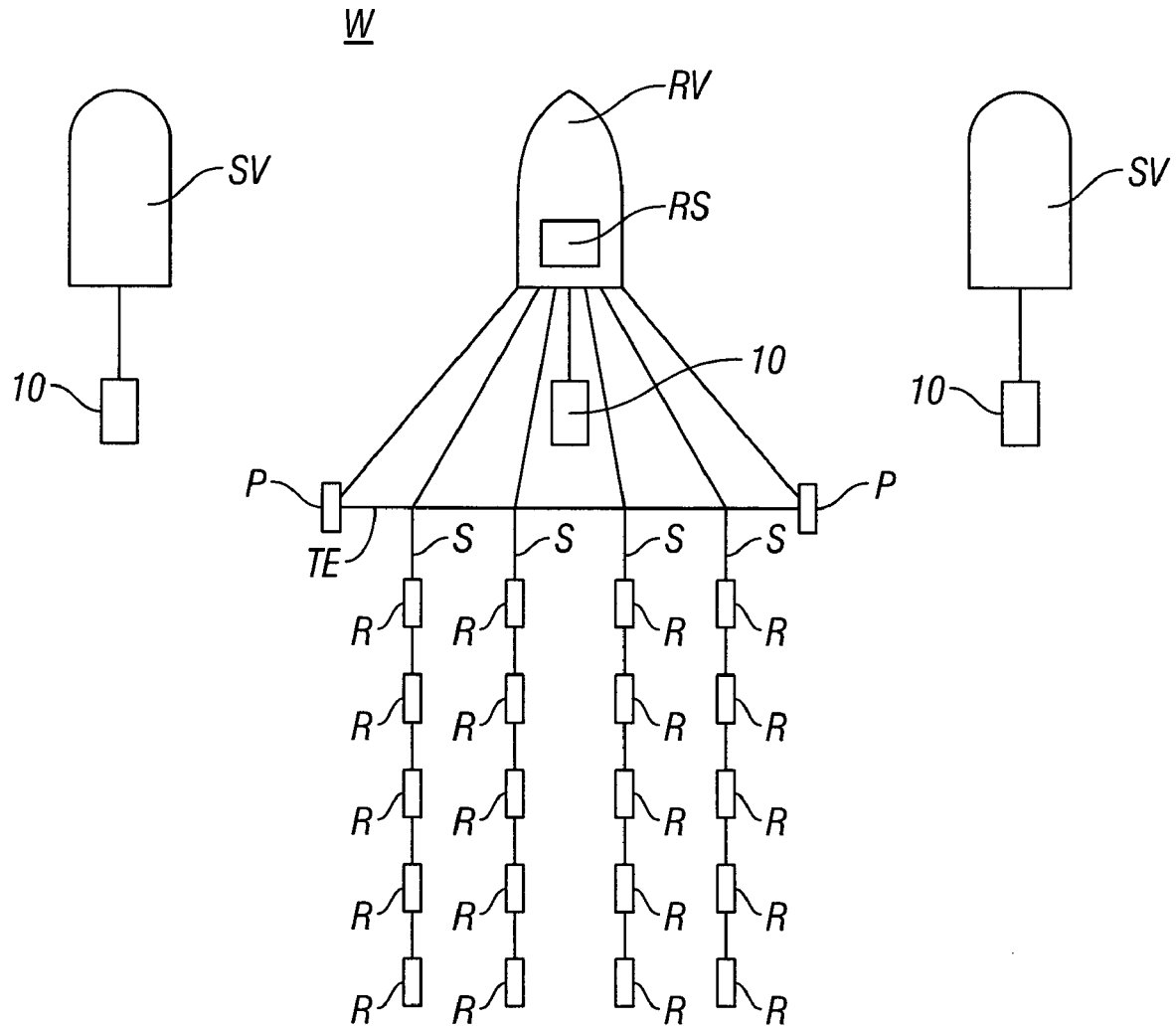
FIG. 1 shows an example marine seismic survey being conducted using a plurality of seismic energy sources.

An example of marine seismic surveying using a plurality of marine vibrator seismic energy sources is shown schematically in FIG. 1. A seismic survey recording vessel RV is shown moving along the surface of a body of water W such as a lake or the ocean. The seismic survey recording vessel RV typically includes equipment, shown at RS and referred to for convenience as a "recording system" that at selected times actuates one or more seismic energy sources 10, determines geodetic position of the various components of the seismic acquisition system, and records signals detected by each of a plurality of seismic receivers R.

The seismic receivers R are typically deployed at spaced apart locations along one or more streamer cables S towed in a selected pattern in the water W by the recording vessel RV (and/or by another vessel). The pattern is maintained by certain towing equipment TE including devices called "paravanes" that provide lateral force to spread the components of the towing equipment TE to selected lateral positions with respect to the recording vessel RV. The configuration of towing equipment TE, paravanes P and streamer cables S is provided to illustrate the principle of acquiring seismic signals according to some aspects of the invention and is not in any way intended to limit the types of recording devices that may be used, their manner of deployment in the water or the number of and type of such components.

The recording vessel RV may tow a seismic vibrator 10. In the example of FIG. 1, additional seismic vibrators 10 may be towed at selected relative positions with respect to the recording vessel RV by source vessels SV. The purpose of providing the additional vibrators 10 towed by source vessels SV is to increase the coverage of the subsurface provided by the signals detected by the seismic receivers R. The numbers of such additional vibrators 10 and their relative positions as shown in FIG. 1 are not intended to limit the scope of the invention.

Figure 2:
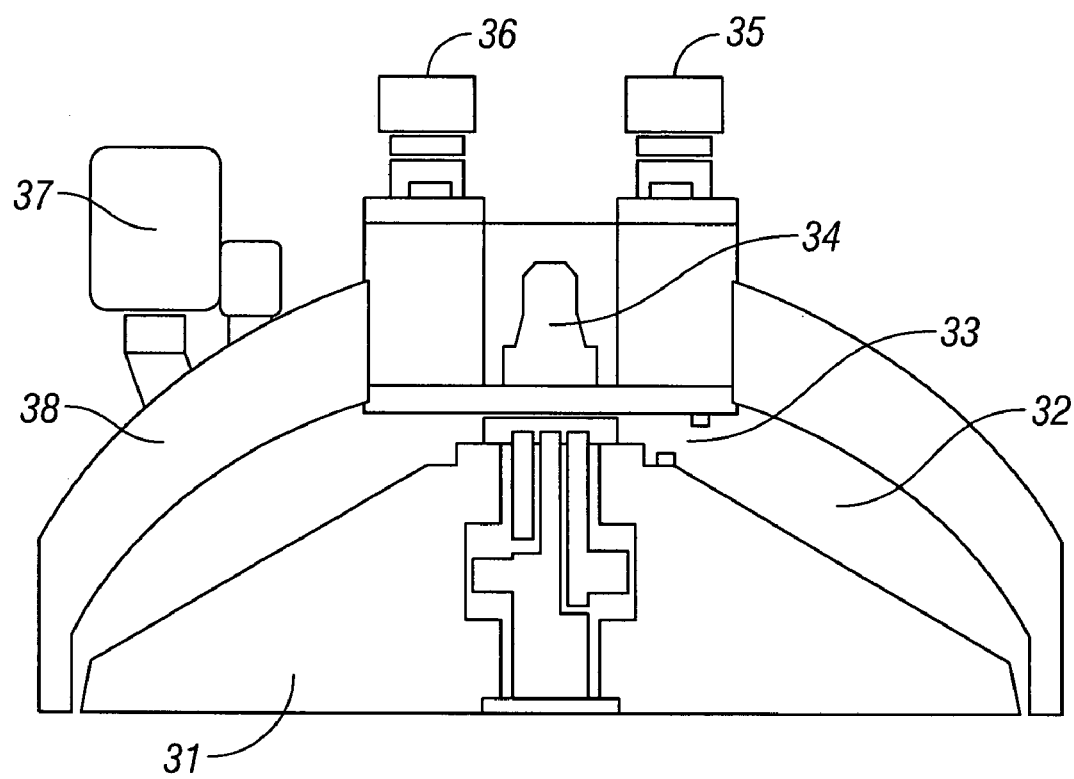
FIG. 2 shows an example structure for a conventional hydraulic seismic vibrator.

FIG. 2 shows an example of a conventional hydraulic marine vibrator. Hydraulic oil feed is shown at 35 and the oil return is shown at 36. A piston (base plate) 31 generates an acoustic pressure wave and is disposed inside a bell housing (reactive mass) 38. Air 32 is disposed between the piston 31 and the bell housing 38. Motion of the piston 31 is regulated with a servo valve 34. An accelerometer 33 is used to provide a feedback or pilot signal. Isolation mounts 37 are mounted on the bell housing 38 to reduce vibrations in the handling system (not shown) used to deploy the vibrator. Due to the rigid design of the vibrator, the first resonance frequency of such a vibrator is typically above the upper limit of the seismic frequency band, and such vibrator will have low efficiency at typical seismic frequencies.

Figure 3:
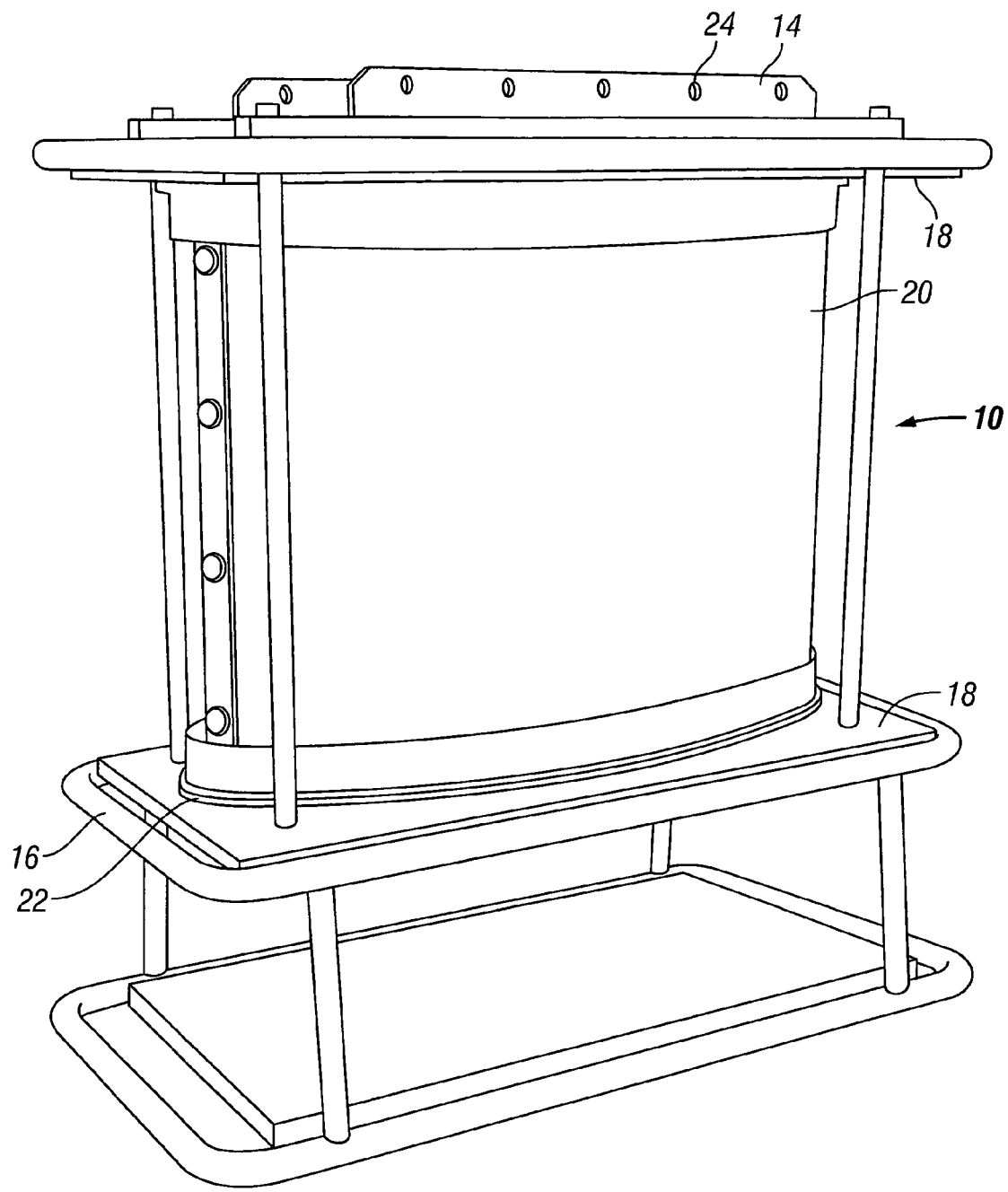
FIG. 3 shows an example structure for an electrical seismic vibrator.

FIG. 3 shows an example of a different type of marine vibrator that can be used in accordance with the invention. The marine vibrator 10 comprises a vibrator source 20 mounted within a frame 16. A bracket 14 is connected to the top of the frame 16 and includes apertures 24 which may be used for deploying the vibrator 10 into the water.

Figure 4:
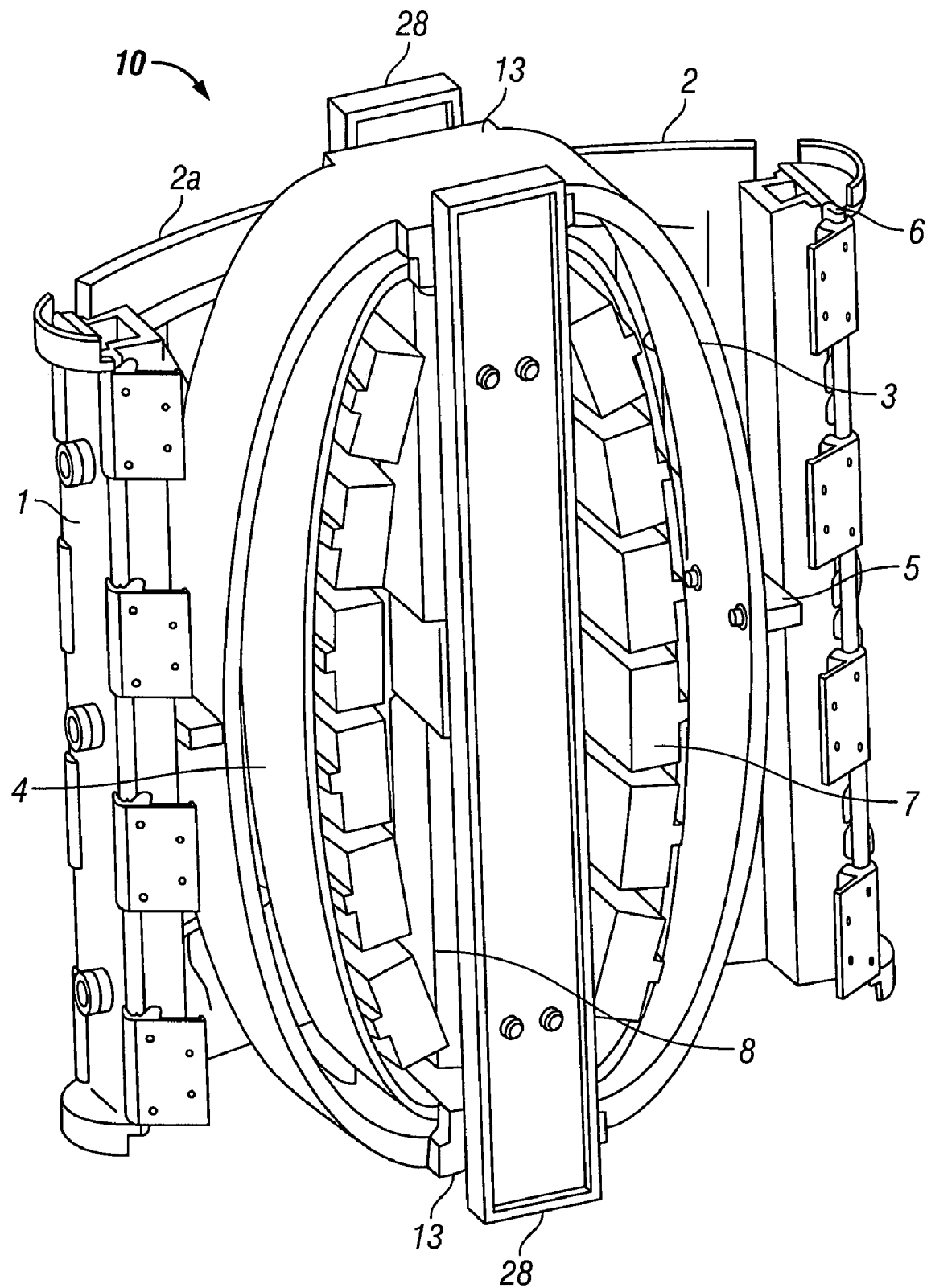
FIG. 4 shows another example vibrator in cross-section.

FIG. 4 shows an example of the vibrator in partial cross-section, which includes a driver 8, which may be a magnetostrictive driver, and which may in some examples be formed from an alloy made from terbium, dysprosium and iron. Such alloy may have the formula Tb(0.3) Dy(0.7) Fe(1.9), such formulation being known commercially as Terfenol-D. Although the particular example vibrator described herein shows only a single driver, an implementation in which a plurality of drivers are used is within the scope of the invention. The present example further includes an outer driver spring 3 connected to each end 13 of the driver 8. In a particular implementation, the driver spring 3 may have an elliptical shape. In the present example in which the driver 8 comprises Terfenol-D, the driver 8 further comprises magnetic circuitry (not specifically shown) that will generate a magnetic field when electrical current is applied thereto. The magnetic field will cause the Terfenol-D material to elongate. By varying the magnitude of the electrical current, and consequently the magnitude of the magnetic field, the length of the driver 8 is varied. Typically, permanent magnets are utilized to apply a bias magnetic field to the Terfenol-D material, and variation in the magnetic field is generated by applying a varying electrical current to the electrical coils (not shown) that are formed around the Terfenol-D material. Variations in the length of the driver 8 cause a corresponding change in the dimensions of the outer driver spring 3.

FIG. 4 shows additional vibrator components including an inner spring 4, with masses 7 attached thereto. As further discussed below, the inner driver spring 4 with masses 7 attached thereto can be included to provide a second system resonance frequency within the seismic frequency range of interest. Although a vibrator system that included only the outer spring 3 would typically display a second resonance frequency, for systems having a size suitable for use in marine geophysical exploration, the second resonance frequency in such case would be much higher than the frequencies within the seismic frequency range of interest (typically from 0 to 300 Hz).

Mounting brackets 28, shown in FIG. 4, are fixedly connected at the upper and lower ends thereof to upper and lower end plates 18 (shown in FIG. 3). The driver 8 is fixedly connected at a longitudinally central location thereof to the mounting brackets 28, to maintain a stable reference point for driver 8. The movement of the ends 13 of the driver rod is unrestricted with respect to the mounting brackets 28.

The example shown in FIG. 4 further includes an outer shell 2, to which the outer spring 3 is connected through transmission elements 5. The form of the shell 2 is generally referred to as flextensional. In a particular implementation, the outer shell 2 comprises two side portions that may be substantially mirror images of each other, and includes two end beams 1, with the side portions of the shell 2 being hingedly connected to the end beams 1 by hinges 6. FIG. 4 shows one of the side portions of the outer shell 2, denoted as shell side portion 2a. When fully assembled the second shell side portion (not shown in FIG. 4), comprising substantially a mirror image of shell side portion 2a will be hingedly connected by hinges 6 to end beams 1, to complete a flextensional shell surrounding the assembled driver 8, outer spring 3 and inner spring 4.

Figure 5:
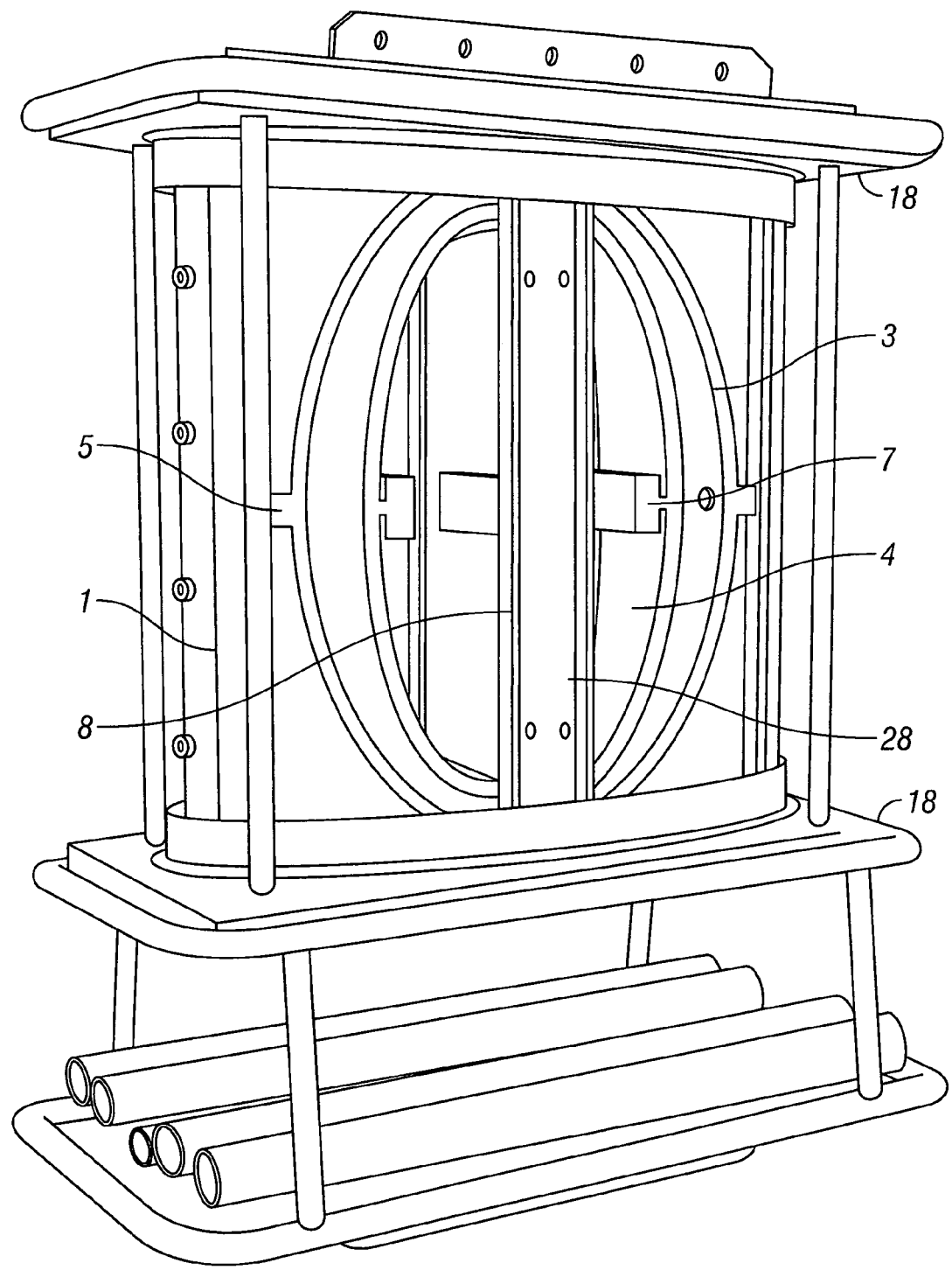
FIG. 5 shows another example vibrator in cross-section.

FIG. 5 shows a cross section of the assembly in FIG. 4 mounted in the marine vibrator 10.

With reference to FIG. 3 the marine vibrator 10 further comprises top and bottom end plates 18. The assembled outer shell 2, comprising the two shell side portions and the two end beams 1 are sealingly attached to the top and bottom end plates 18. Although the outer shell 2 is sealingly engaged with the top and bottom end plates 18, when the marine vibrator 10 is in operation, the outer shell 2 will enable movement with respect to the end plates 18, so the connection between the end plates 18 and the outer shell 2 will be a flexible connection, that might be provided, for example, by a flexible membrane 22 (not shown in detail).

Figure 6:
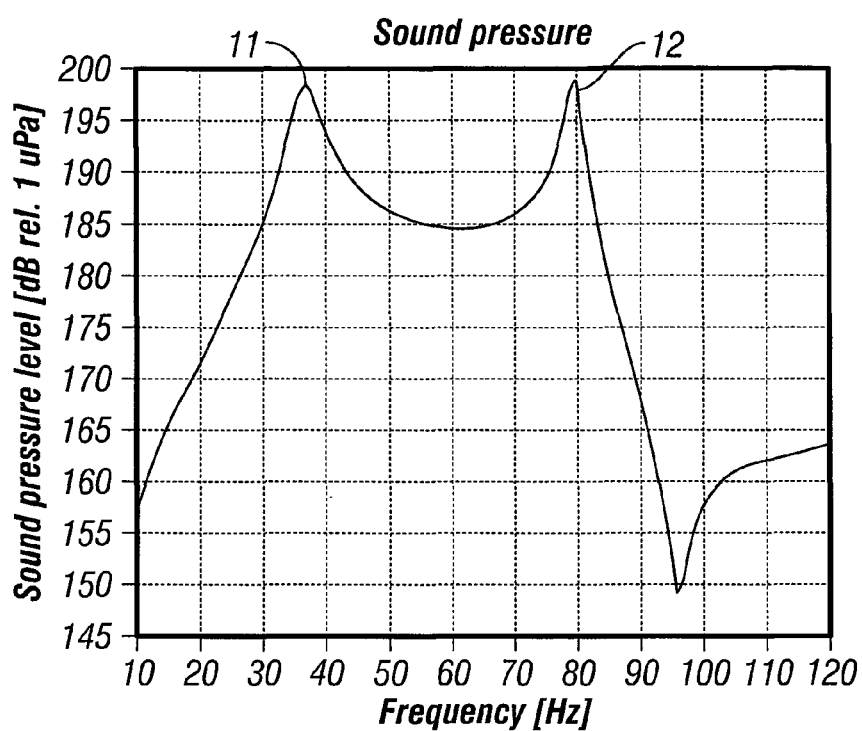
FIG. 6 shows a simulated amplitude spectrum with two resonances.
Figure 7:
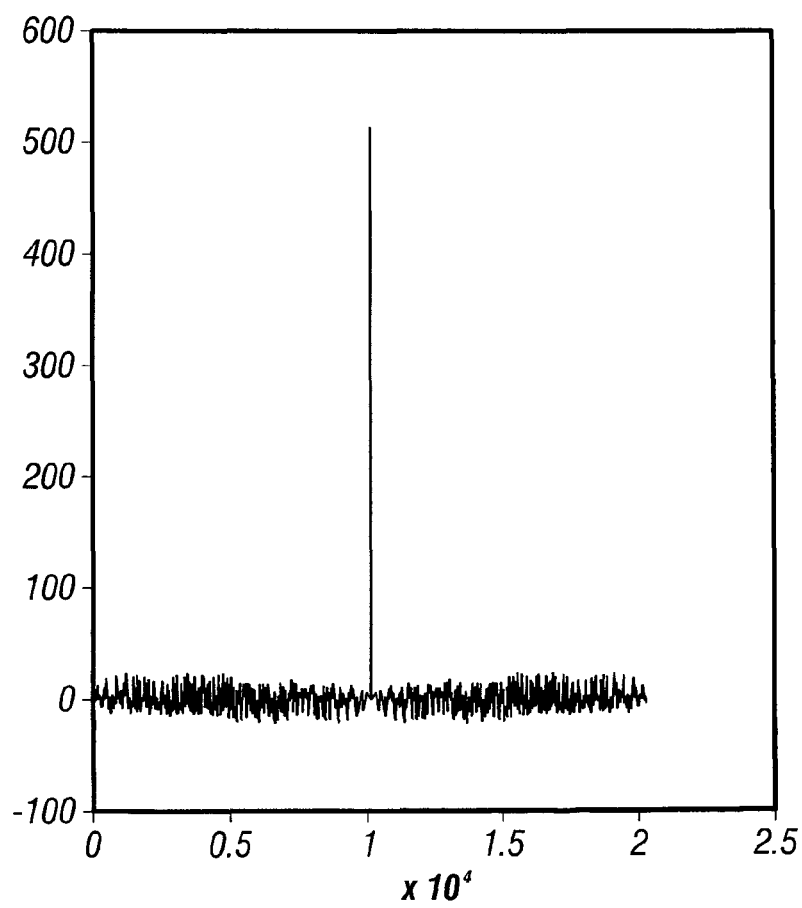
FIG. 7 is an example autocorrelation function for one type of direct sequence spread spectrum signal.

FIG. 6 shows the results from a finite element simulation of an example of the vibrator. A first resonance frequency 11 results substantially from interaction of the outer spring 3 and the driver. A second resonance frequency 12 results substantially from the interaction of the inner driver spring 4 with its added masses 7 and the driver 8.

The outer driver spring 3 and the inner driver spring 4 shown in the figures could be different types of springs than those shown. For example, the springs might be coiled springs or other type of springs that perform substantially similarly. Essentially, the springs 3 and 4 are biasing devices that provide a force related to an amount of displacement of the biasing device. Similarly, the outer spring 3 and inner driver spring 4 might use a diaphragm, a piston in a sealed cylinder or a hydraulic cylinder to achieve the substantially the same result.

By introducing a resonance in the lower end of the seismic frequency spectrum, low frequency acoustic energy may be generated more efficiently. At resonance the imaginary (reactive) part of the impedance is substantially cancelled, and the acoustic source is able to efficiently transmit acoustic energy into the water. In constructing any specific implementation of the marine vibrator, finite element analysis may be used, as is known to those skilled in the art, to determine the first and second resonance frequencies. In any such analysis, the following principles of operation are relevant. If the outer shell is approximated as a piston, then, for low frequencies, the mass load, or the equivalent fluid mass acting on the shell can be expressed as $$M = \rho_0 \frac{8a^3}{3} \qquad \text{(Eq. 11)}$$

where, M is the mass load, $\rho_0$ is density of water, and a is the equivalent radius for a piston which corresponds to the size of outer shell.

The outer shell 2 has a transformation factor $T_{shell}$ between the long and short axis of its ellipse, so that the deflection of the two shell side portions (side portion 2a in FIG. 4 and its mirror image on the other side of outer shell 2) will have a higher amplitude than the deflection of end beams 1 (which interconnects the two side portions of shell 2) caused by movement of transmission element 5. Further, the outer spring 3 creates a larger mass load on the driver 8 since the outer spring 3 also has a transformation factor between the long axis and short axis of its ellipse, with the long axis being substantially the length of the driver 8 and the short axis being the width of the elliptically shaped spring. Referring to this transformation factor as $T_{spring}$, the mass load on the driver 8 will be expressed as:

$$M_{driver} = (T_{shell})^2 \cdot (T_{spring})^2 \cdot \rho_0 \frac{8a^3}{3}. \qquad \text{(Eq. 12)}$$

The first resonance, $f_{resonance}$, for the vibrator will be substantially determined by the following mass spring relationship $$f_{resonance} = \frac{1}{2\pi}\sqrt{\frac{K}{M_{driver}}} \qquad \text{(Eq. 13)}$$

where K=spring constant, and $M_{outer}$=mass load on the driver 8.

K represents the spring constant for the outer spring 3 combined with the drive 8, where the outer spring 3 is connected to the outer shell 2, through the transmission elements 5, end beam 1 and hinges 6.

To provide efficient energy transmission with the seismic frequency range of interest, it is important to have the vibrator configured to have a second resonance frequency within the seismic frequency range of interest. In the absence of the inner spring, the second resonance frequency would occur when the outer driver spring 3, acting together with driver 8, has its second Eigen-mode. This resonance frequency, however, is normally much higher than the first resonance frequency, and accordingly, would be outside the seismic frequency range of interest. As is evident from the foregoing equation, the resonant frequency will be reduced if the mass load on outer spring 3 is increased. This mass load could be increased by adding mass to driver 8, however, in order to add sufficient mass to achieve a second resonance frequency within the seismic frequency range of interest, the amount of mass that would need to be added to the driver would make such a system impractical for use in marine seismic operations. In a practical example vibrator, a second spring, the inner driver spring 4, is included inside the outer driver spring 3 with added masses 7 on the side of the inner spring 3. The effect of such added mass is equivalent to adding mass in the end of the driver 8.

$$M_{inner} = (T_{inner})^2 \cdot M_{added}. \qquad \text{(Eq. 14)}$$

The extra spring, i.e., the inner driver spring 4, will have a transformation factor $T_{inner}$ as well, and will add to the mass load on the driver 8. Use of the inner spring 4, with the added mass, allows the second resonance of the system to be tuned so that the second resonance is within the seismic frequency range of interest, thereby improving the efficiency of the vibrator in the seismic frequency band. The second resonance may be determined by the expression:

$$f_{resonance2} = \frac{1}{2\pi}\sqrt{\frac{K_{inner} + K_{driver}}{(T_{inner})^2 \cdot M_{added}}}. \qquad \text{(Eq. 15)}$$

in which $K_{inner}$=spring constant of inner spring and $K_{driver}$=spring constant of outer driver assembly.

A possible advantage of using a driver structure as explained herein is that the multiple resonant frequencies may provide a broader bandwith response than is possible using single resonance vibrator structures. A particular advantage of using a vibrator having an electrically operated energizing element (driver) is that the vibrator response to an input control signal will be more linear. Such may make possible the use of particular types of driver signals to be explained below.

In using the system shown in FIG. 1, it may be advantageous to use more than one of the seismic vibrators 10 substantially contemporaneously or even simultaneously in order to increase the efficiency with which seismic signals related to subsurface formations (below the water bottom) may be obtained. Seismic signals detected by each of the receivers R in such circumstances will result in seismic energy being detected that results from each of the vibrators 10 actually in operation at the time of signal recording. Operating the vibrators contemporaneously should include driving each vibrator with a signal that is substantially uncorrelated with the signal used to drive each of the other vibrators. By using such driver signals to operate each of the vibrators, it is possible to determine that portion of the detected seismic signals that originated at each of the seismic vibrators.

A type of driver signal to operate the marine vibrators in some examples is known as a "direct sequence spread spectrum" signal. Direct sequence spread spectrum signal ("DSSS") generation uses a modulated, coded signal with a "chip" frequency selected to determine the frequency content (bandwidth) of the transmitted signal. A "chip" means a pulse shaped bit of the direct sequence coded signal. Direct sequence spread spectrum signals also can be configured by appropriate selection of the chip frequency and the waveform of a baseband signal so that the resulting DSSS signal has spectral characteristics similar to background noise. The foregoing may make DSSS signals particularly suitable for use in environmentally sensitive areas.

Figure 1A:
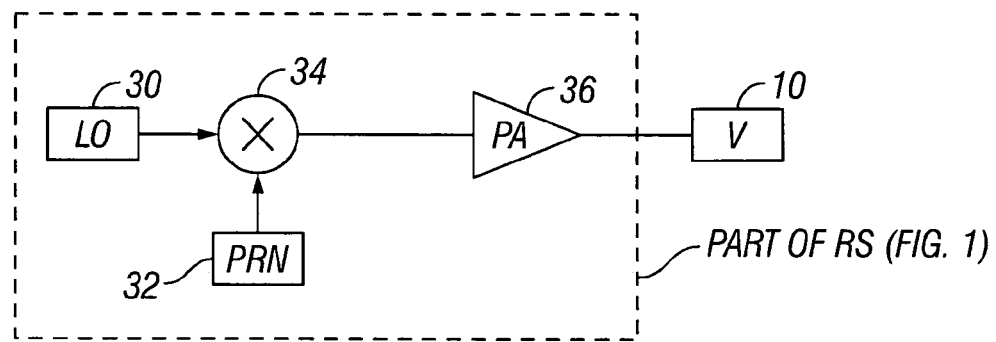
FIG. 1A shows an example implementation of a seismic vibrator signal generator.

An example implementation of a signal generator to create particular types of vibrator signals used in the invention is shown schematically in FIG. 1A. A local oscillator 30 generates a baseband carrier signal. In one example, the baseband carrier signal may be a selected duration pulse of direct current, or continuous direct current. In other examples, the baseband signal may be a sweep or chirp as used in conventional vibrator-source seismic surveying, for example traversing a range of 10 to 150 Hz. A pseudo random number ("PRN") generator or code generator 32 generates a sequence of numbers +1 and −1 according to certain types of encoding schemes as will be explained below. The PRN generator 32 output and the local oscillator 30 output are mixed in a modulator 34. Output of the modulator 34 is conducted to a power amplifier 36, the output of which ultimately operates one of the seismic vibrators 10. A similar configuration may be used to operate each of a plurality of vibrators such as shown in FIG. 1.

Figure 1B:
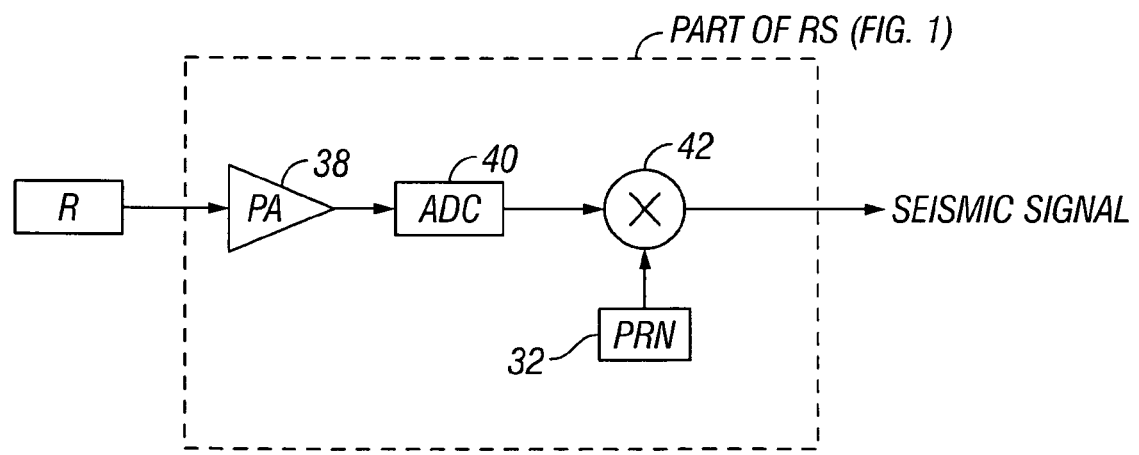
FIG. 1B shows an example signal detection device coupled to a seismic receiver.

Signals generated by the device shown in FIG. 1A can be detected using a device such as shown in FIG. 1B. Each of the seismic receivers R may be coupled to a preamplifier 38, either directly or through a suitable multiplexer (not shown). Output of the preamplifier 38 may be digitized in an analog to digital converter ("ADC") 40. A modulator 42 mixes the signal output from the ADC 40 with the identical code produced by the PRN generator 32. As will be explained below, the signal generating device shown in FIG. 1A, and its corresponding signal detection device shown in FIG. 1B generate and detect a DSSS.

The theoretical explanation of DSSS signal generation and detection may be understood as follows. The DSSS signal, represented by $u_i$, can be generated by using a spectrum "spreading code", represented by $c_i$ and generated, for example, by the PRN generator (32 in FIG. 1A), to modulate a baseband carrier. A baseband carrier can be generated, for example, by the local oscillator (30 in FIG. 1A). The baseband carrier has a waveform represented by $\psi(t)$. The spreading code has individual elements $c_{ij}$ (called "chips") each of which has the value +1 or −1 when $0 \leq j < N$ and 0 for all other values of j. If a suitably programmed PRN generator is used, the code will repeat itself after a selected number of chips. N is the length (the number of chips) of the code before repetition takes place. The baseband carrier is preferably centered in time at t=0 and its amplitude is normalized so that at time zero the baseband carrier amplitude is equal to unity, or ($\psi(0)=1$). The time of occurrence of each chip i within the spreading code may be represented by Tc. The signal used to drive each vibrator may thus be defined by the expression:

$$u_i(t) = \sum_{j=-\infty}^{\infty} c_i^j \psi(t - jT_c) \qquad \text{(Eq. 16)}$$

The waveform $u_i(t)$ is deterministic, so that its autocorrelation function is defined by the expression:

$$R_u(\tau) = \int_{-\infty}^{\infty} u(t)u(t-\tau)\,dt \qquad \text{(Eq. 17)}$$

where $\tau$ is the time delay between correlated signals. The discrete periodic autocorrelation function for $a=a_j$ is defined by $$R_{a,a}(l) = \begin{cases} \sum_{j=0}^{N-1-l} a_j a_{j+l}, & 0 \le l \le N-1 \\ \sum_{j=0}^{N-1+l} a_{j-l} a_j, & 1-N \le l < 0 \\ 0, & |l| \ge N \end{cases} \qquad \text{(Eq. 18)}$$

Using a formula similar to Eq. 17 it is possible to determine the cross correlation between two different signals by the expression:

$$R_{u,u'}(\tau) = \int_{-\infty}^{\infty} u(t)u'(t-\tau)\,dt \qquad \text{(Eq. 19)}$$

The discrete periodic cross-correlation function for $a=a_j$ and $b=b_j$, is defined by the expression:

$$R_{a,b}(l) = \begin{cases} \sum_{j=0}^{N-1-l} a_j b_{j+l}, & 0 \le l \le N-1 \\ \sum_{j=0}^{N-1+l} a_{j-l} b_j, & 1-N \le l < 0 \\ 0, & |l| \ge N \end{cases} \qquad \text{(Eq. 20)}$$

The signal detected by the receivers (R in FIG. 1) will include seismic energy originating from the one of the vibrators for which seismic information is to be obtained, as well as several types of interference, such as background noise, represented by n(t), and from energy originating from the other vibrators transmitting at the same time, but with different direct sequence spread spectrum codes (represented by $c_k(t)$ wherein $k \ne i$). The received signal at each receiver, represented by $x_i(t)$, that is, the signal detected by each of the receivers (R in FIG. 1) in a system with M seismic vibrators operating at the same time, can be described by the expression:

$$x_i(t) = \sum_{j=1}^{M} u_j(t) + n(t) \qquad \text{(Eq. 21)}$$

The energy from each vibrator will penetrate the subsurface geological formations below the water bottom, and reflected signals from the subsurface will be detected at the receivers after a "two way" travel time depending on the positions of the vibrators and receivers and the seismic velocity distribution in the water and in the subsurface below the water bottom. If the transmitted vibrator signal for direct sequence spread spectrum code i occurs at time $t=t_0$, then the received signal resulting therefrom occurs at time $t=\tau_k+l_k T_c + t_0$ after the transmission, wherein $l_k$=any number being an integer and $\tau_k$=the misalignment between the received signal and the chip time $T_c$. The received signal can be mixed with the identical spreading code used to produce each vibrator's output signal, $u_i(t_0)$, as shown in FIG. 1B. Such mixing will provide a signal that can be correlated to the signal used to drive each particular vibrator. The mixing output can be used to determine the seismic response of the signals originating from each respective vibrator. The foregoing may be expressed as follows for the detected signals:

$$\begin{aligned} y_i(\tau_i + l_i T_c + t_0) &= u_i(t_0) x_i(\tau_i + l_i T_c + t_0) \qquad \text{(Eq. 22)} \\ &= u_i(0) x_i(\tau_i + l_i T_c) \\ &= u_i(0)\left(\sum_{k=1}^{K} u_k(\tau_k + l_k T_c) + n(t)\right) \\ &= u_i(\tau + l_i T_c) u_i(0) + \\ &\quad \sum_{k=1, k \ne i}^{M} u_k(\tau_k + l_k T_c) u_i(0) + u_i(t) n(t) \end{aligned}$$

Mixing (FIG. 1B) the detected signal with the spreading code results in a correlation. The result of the correlation is:

$$R_{yu_i}(\tau_i + l_i T_c) = \qquad \text{(Eq. 23)}$$
$$\sum_{j=0}^{N-1} \psi(0)\psi(\tau_i) c_i^j c_i^{j+l} + \sum_{j=0}^{N-1}\left[\psi(0)\sum_{k=1,k\ne i}^{M} \psi(\tau_k) c_i^j c_k^{j+l_k}\right] + u_i(t)n(t)$$

Simplification of the above expressions provides the following result:

$$R_{yu_i}(\tau_i + l_i T_c) = d_i \psi(0)\psi(\tau_i) \sum_{j=0}^{N-l_i-1} c_i^j c_i^{j+l} + \qquad \text{(Eq. 24)}$$
$$\psi(0) \sum_{k=1, k\ne i}^{M}\left[\sum_{j=0}^{N-l_k-1} \psi(\tau_k) c_i^j c_k^{j+l_k}\right] +$$
$$u_i(t)n(t)$$
$$= \psi(0)\psi(\tau_i) R_{u_i u_i}(l_i) +$$
$$\psi(0) \sum_{k=1, k\ne i}^{M} [\psi(\tau_k) R_{u_i u_j}(l_k)] + u_i(t)n(t)$$

If R(0)=N and ψ(0)=1, the foregoing expression simplifies to:

$$R_{yu_i}(0) = \psi(0)^2 R_{u_i u_i}(0) + \quad \text{(Eq. 25)}$$

$$\psi(0) \sum_{k=1, k \neq i}^{M} \left[\psi(\tau_k) R_{u_i u_j}(l_k)\right] + u_i(t)n(t)$$

$$= \underbrace{N}_{data} + \underbrace{\sum_{k=1, k \neq i}^{M} \left[\psi(\tau_k) R_{u_i u_j}(l_k)\right]}_{cross\_correlations} +$$

$$\underbrace{u_i(t)n(t)}_{background\_noise}$$

Equation (25) shows that it is possible to separate the direct spread spectrum sequence signals corresponding to each spreading code from a signal having components from a plurality of spreading codes. N in essence represents the autocorrelation of the transmitted signal, and by using substantially orthogonal or uncorrelated spread spectrum signals to drive each marine vibrator, the cross correlation between them will be very small compared to N. Another possible advantage is that any noise which appears during a part of the time interval when the seismic signals are recorded will be averaged out for the whole record length and thereby attenuated, as may be inferred from Eq. 25.

In a practical implementation, a seismic response of the subsurface to imparted seismic energy from each of the vibrators may be determined by cross correlation of the detected seismic signals with the signal used to drive each vibrator, wherein the cross correlation includes a range of selected time delays, typically from zero to an expected maximum two way seismic energy travel time for formations of interest in the subsurface (usually about 5 to 6 seconds). Output of the cross correlation may be stored and/or presented in a seismic trace format, with cross correlation amplitude as a function of time delay.

The baseband carrier has two properties that may be optimized. The baseband carrier should be selected to provide the vibrator output with suitable frequency content and an autocorrelation that has a well defined correlation peak. Equation (25) also shows that the length of the direct spread spectrum sequence will affect the signal to noise ratio of the vibrator signal. The correlation peaks resulting from the cross correlation performed as explained above will increase linearly with the length of (the number of chips) the spreading code. Larger N (longer sequences) will improve the signal to noise properties of the vibrator signal.

Using appropriately selected spreading code sequences it is possible to generate seismic signals that approximate background noise in spectral statistics. Some useful sequences that can be used for a plurality of seismic vibrators are discussed below.

"Maximum length" sequences are a type of cyclic code that are generated using a linear shift register which has m stages connected in series, with the output of certain stages added modulo-2 and fed back to the input of the shift register. The name "maximum length" sequence derives from the fact that such sequence is the longest sequence that can be generated using a shift register. Mathematically the sequence can be expressed by the polynomial h(x)

$$h(x) = h_0 x_m + h_1 x_{m-1} + \ldots + h_{n-1} x + h_n \quad \text{(Eq. 26)}$$

For $1 \leq j < m$, then $h_j=1$ if there is feedback at the j-th stage, and $h_j=0$ if there is no feedback at j-th stage. $h_0=h_m=1$. Which stage $h_j$ that should be set to one or zero is not random but should be selected so that h(x) becomes a primitive polynomial. "Primitive" means that the polynomial h(x) cannot be factored. The number of chips for a maximum length sequence is given by the expression N=2m−1, where m represents the number of stages in the shift register. The maximum length sequence has one more "1" than "0." For a 511 chip sequence, for example, there are 256 ones and 255 zeros.

Another type of sequence that may be used is the Gold sequence. The structure of Gold sequences is described in, R. Gold, *Optimal binary sequences for spread spectrum multiplexing*, IEEE Trans. Information Theory, vol. IT-13, pp. 619-621 (1967). Gold sequences have good cross correlation characteristics suitable for use when more than one vibrator is used at the same time. Gold sequences are generated using two or more maximum length sequences. It is possible to generate N+2 Gold-sequences from maximum length sequences, where N is the sequence length. Gold-sequences have the period $N=2^m-1$ and exist for all integers m that are not a multiple of 4. A possible drawback of Gold sequences is that the autocorrelation is not as good as for maximum length sequences.

Kasami sequence sets may be used in some examples because they have very low cross correlation. There are two different sets of Kasami sequences. A procedure similar to that used for generating Gold sequences will generate the "small set" of Kasami sequences with $M=2^{n/2}$ binary sequences of period $N=2^n-1$, where n is an even integer. Such procedure begin with a maximum length sequence, designated a, and forming the sequence a' by decimating a by $2^{n/2}+1$. It can be shown that the resulting sequence a' is a maximum sequence with period $2^{n/2}-1$. For example, if n=10, the period of a is N=1023 and the period of a' is 31. Therefore, by observing 1023 bits of the sequence a', one will observe 33 repetitions of the 31-bit sequence. Then, by taking $N=2^n-1$ bits of sequences a and a' it is possible to form a new set of sequences by adding, modulo-2, the bits from a and the bits from a' and all $2^{n/2}-2$ cyclic shifts of the bits from a'. By including a in the set, a result is a set of $2^{n/2}$ binary sequences of length $N=2^n-1$. The autocorrelation and cross correlation functions of these sequences take on the values from the set $\{-1, -(2^{n/2}+1), 2^{n/2}-1\}$. The "large set" of Kasami sequences again consists of sequences of period $2^n-1$, for n being an even integer, and contains both the Gold sequences and the small set of Kasami sequences as subsets. See, for example, *Spreading Codes for Direct Sequence CDMA and Wideband CDMA Cellular Networks*, IEEE Communications Magazine, September 1998.

Figure 8:
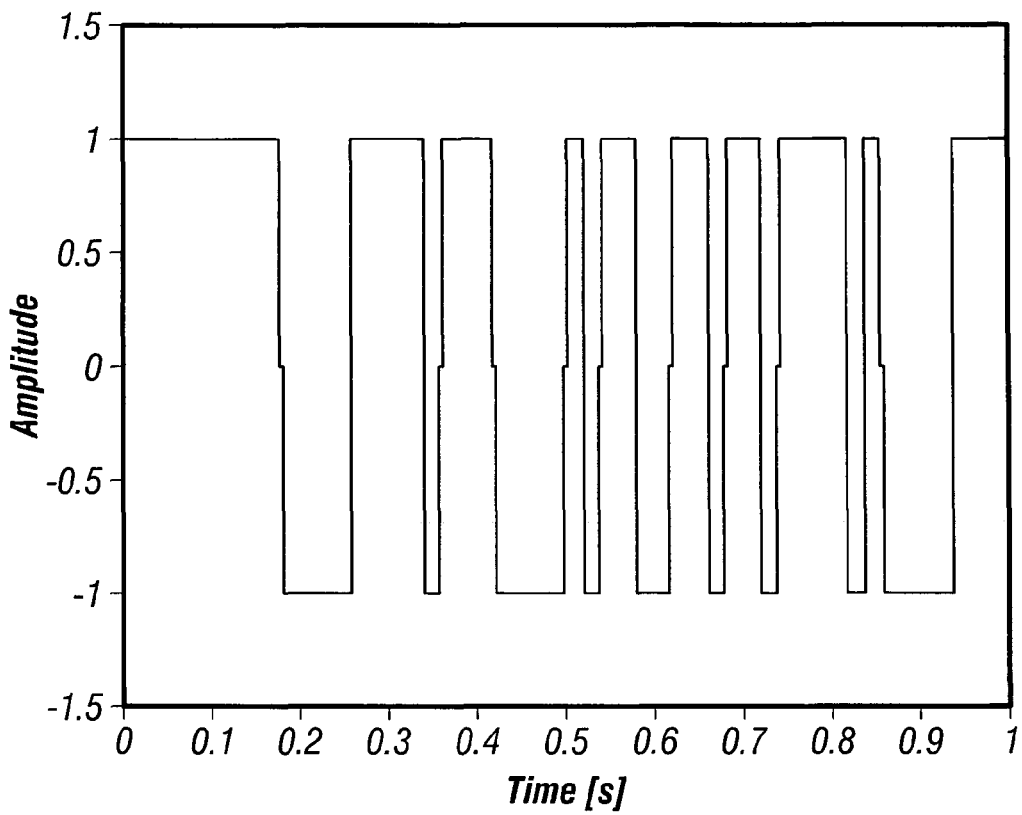
FIG. 8 is an example of a direct sequence spread spectrum (DSSS) code.
Figure 9:
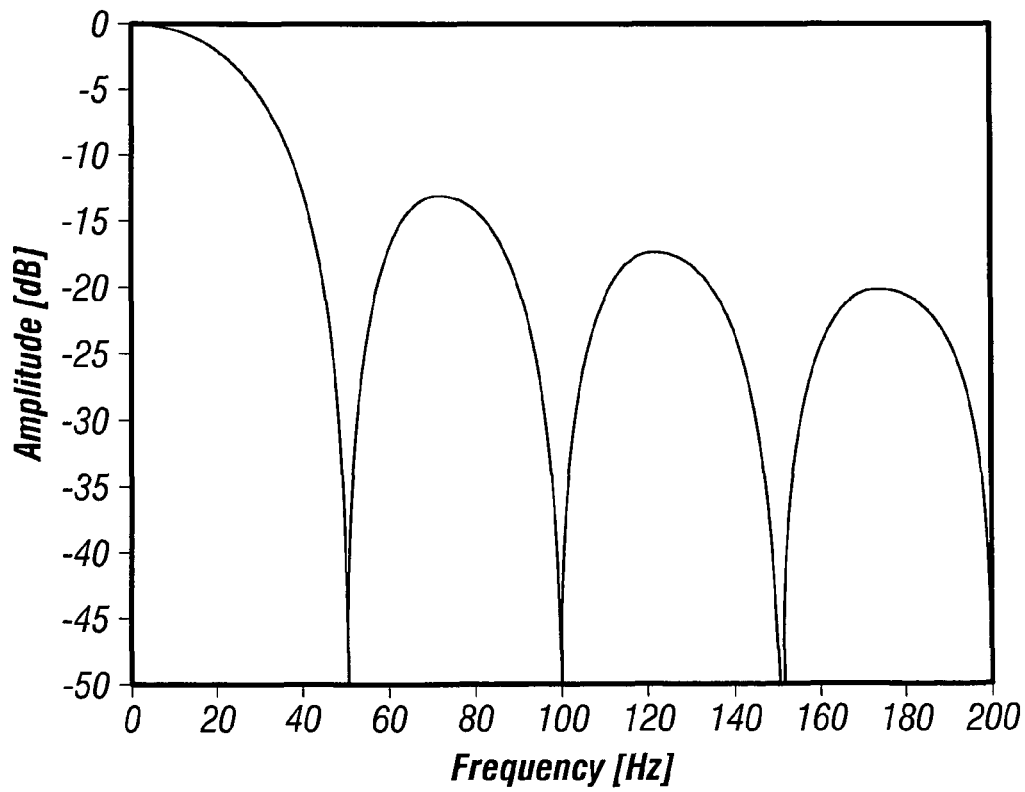
FIG. 9 is a graph of frequency content of a seismic source driver using a signal coded according to FIG. 8.
Figure 10:
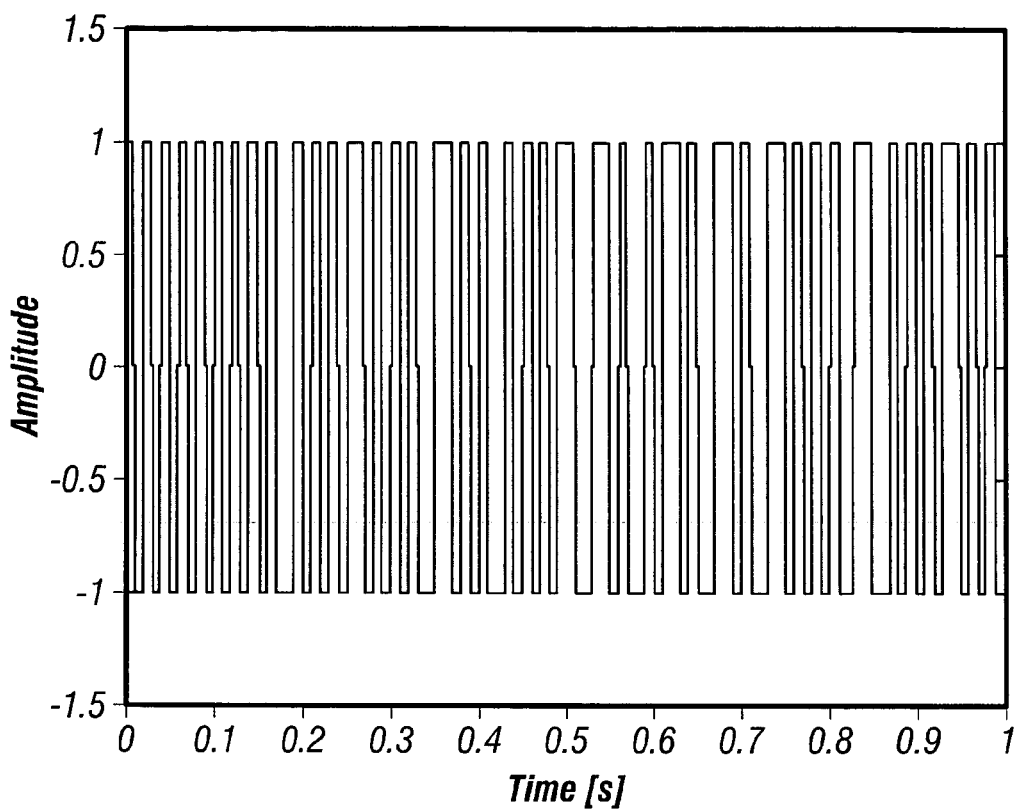
FIG. 10 is an example spread spectrum code using biphase modulation.
Figure 11:
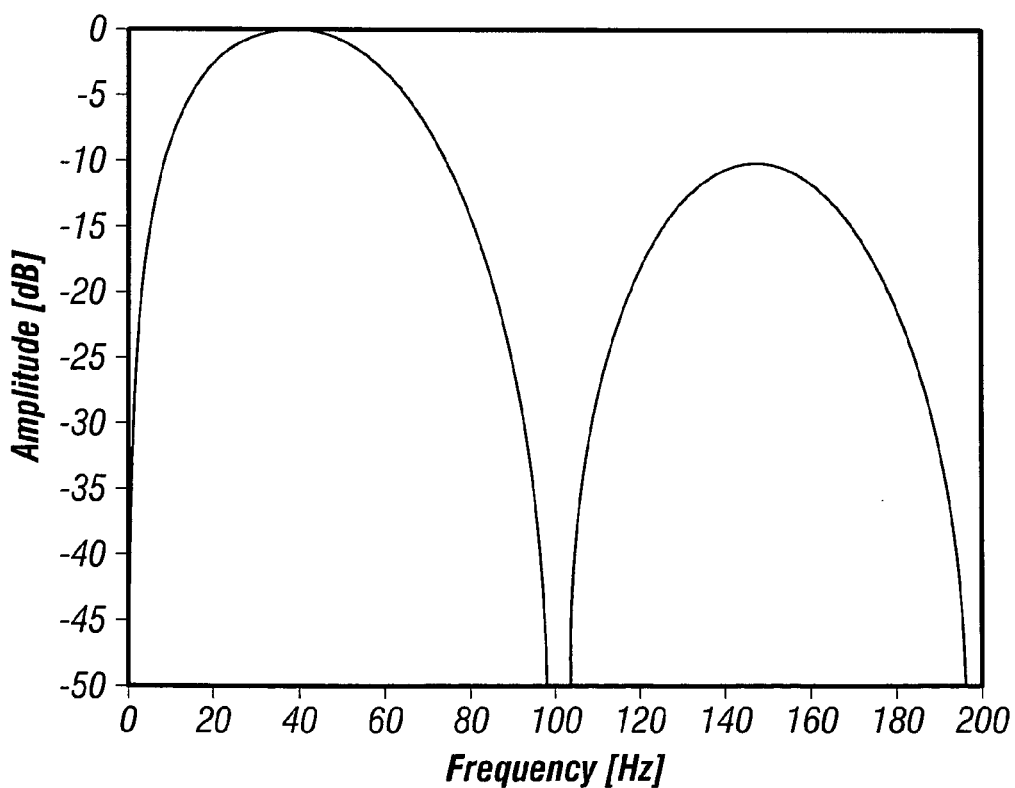
FIG. 11 is a graph of the frequency content of a seismic source driver using a signal coded according to FIG. 10.

In implementing spreading codes to generate a driver signal for the vibrators, it may be preferable to use biphase modulation to generate the chips in the code. Referring to FIG. 8, an example spreading code is shown wherein a change in polarity from +1 to −1 represents the number −1, and the reverse polarity change represents the number +1. The signal spectrum generated by the above spreading code is shown in FIG. 9. What is apparent from FIG. 9 is that a substantial signal amplitude exists at DC (zero frequency). Such signal spectrum is generally not suitable for seismic signal generation. If the modulation used is biphase, however, the signal amplitude at zero frequency is substantially zero. The same spreading code shown in FIG. 8 implemented using biphase modulation is shown in FIG. 10. Biphase modulation can be implemented by having every bit of the original input signal (chips in the spreading code) represented as two logical states which, together, form an output bit. Every logical "+1" in the input can be represented, for example, as two different bits (10 or 01) in the output bit. Every input logical "−1" can be represented, for example, as two equal bits (00 or 11) in the output. Thus, every logical level at the start of a bit cell is an inversion of the level at the end of the previous cell. In biphase modulation output, the logical +1 and −1 are represented with the same voltage amplitude but opposite polarities. The signal spectrum of the spreading code shown in FIG. 10 is shown in FIG. 11. The signal amplitude at zero frequency is very small (below −50 dB), thus making such code more suitable for seismic energy generation.

In some examples, more than one vibrator may be used at a particular location in the water, for example, as shown at 10 in FIG. 1, wherein each vibrator has a different frequency response. In some examples, a low frequency response vibrator may be used to generate a low frequency part of the seismic signal e.g., (3-25 Hz) and another, higher frequency vibrator may be used to generate higher frequency seismic energy (e.g., 25-100 Hz). In other examples, the multiple resonance vibrator structure discussed above may be used. As explained above, such vibrators may have two or more resonance frequencies within the seismic frequency band (e.g., approximately 0 to 300 Hz.)

Figure 12A:
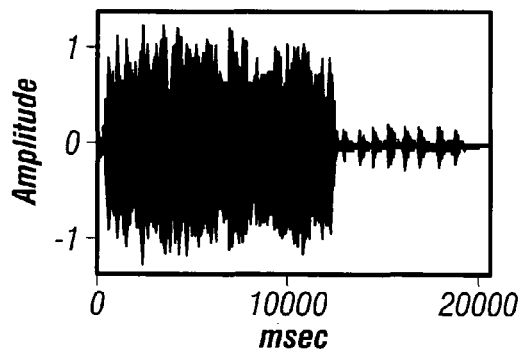
FIGS. 12A and 12B show, respectively, a DSSS signal and response of a low frequency vibrator to the DSSS driver signal.
Figure 12B:
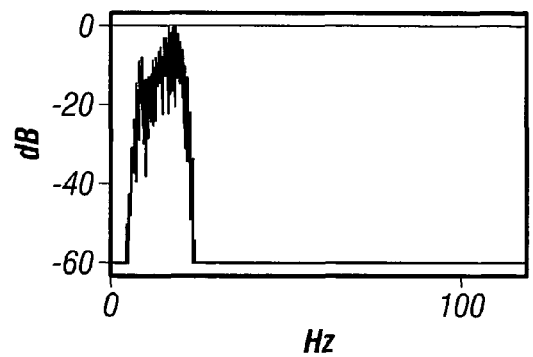
Figure 13A:
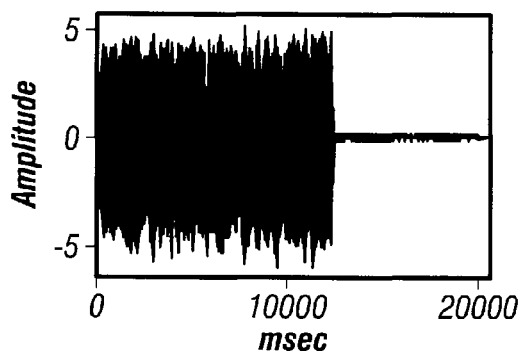
FIGS. 13A and 13B show, respectively, a DSSS signal and response of a higher frequency vibrator than that shown in FIG. 12B to the DSSS driver signal.
Figure 13B:
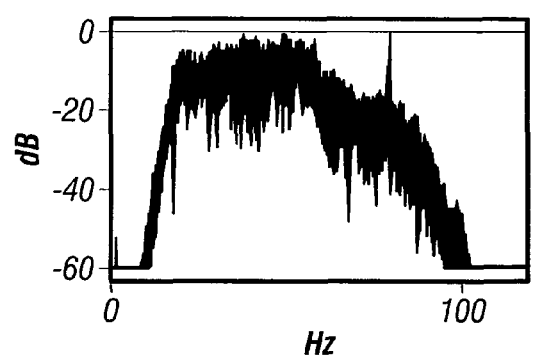
Figure 14A:
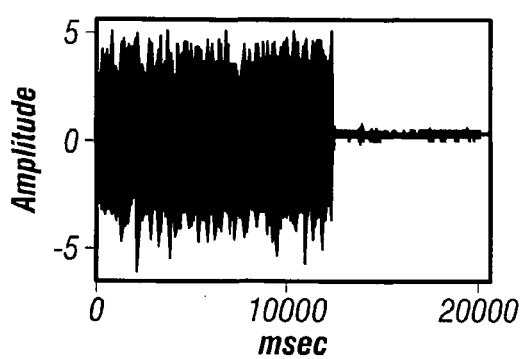
FIGS. 14A and 14B show, respectively, combined DSSS signals and output of the two vibrators as shown in FIGS. 12A, 12B, 13A and 13B.
Figure 14B:
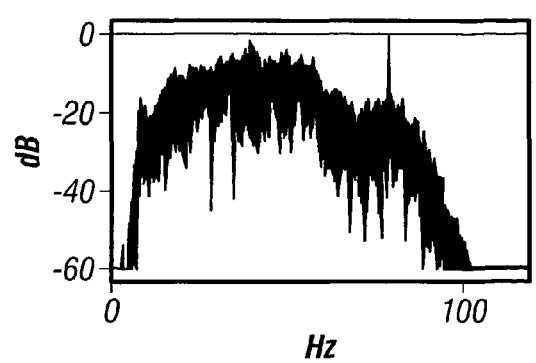
Figure 15:
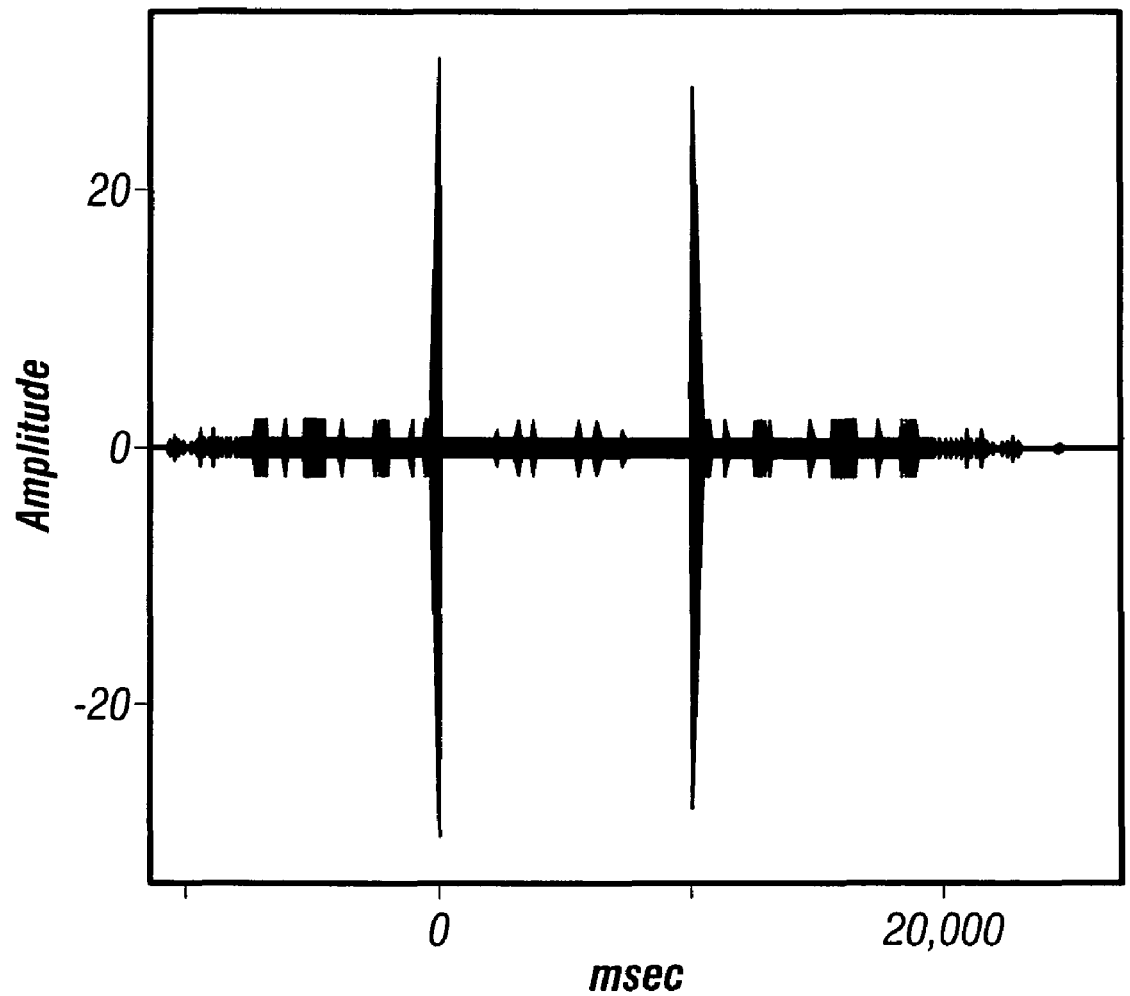
FIG. 15 shows an autocorrelation of the sum of the signals in FIGS. 13A and 14A.

An example of a low frequency DSSS code used to drive a suitably configured vibrator is shown in FIG. 12A. The DSSS code may be configured to provide a selected frequency output by suitable selection of the chip rate. A spectrum of energy output of a suitably configured vibrator using the code of FIG. 12A is shown in corresponding FIG. 12B. FIG. 13A shows a DSSS code used to drive a higher frequency configured vibrator. Responses of the vibrator (signal output spectrum) of such vibrator to the DSS code of FIG. 13A is shown in FIG. 13B. Both seismic signals are effectively summed. After detection of the signals from each such vibrator in the received seismic signals as explained above, the detected signals may be summed. The combined DSSS signals are shown in FIG. 14A, and the combined vibrator output spectrum is shown in FIG. 14B. An autocorrelation of the summed signals is shown in FIG. 15 indicating two distinct correlation peaks, one for each DSSS code. The various vibrators may each be operated at a selected depth in the water corresponding to the frequency range of each vibrator.

Seismic vibrators and methods for operating such vibrators according to the various aspects of the invention may provide more robust seismic signal detection, may reduce environmental impact of seismic surveying by spreading seismic energy over a relatively wide frequency range, and may increase the efficiency of seismic surveying by enabling simultaneous operation of a plurality of seismic sources while enabling detection of seismic energy from individual ones of the seismic sources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating seismic energy for subsurface surveying, comprising:
   operating a first seismic vibrator and
   operating at least a second seismic vibrator substantially contemporaneously with the operating the first seismic vibrator, the operating the first and the at least a second seismic vibrators including applying a driver signal to each of the first and the at least a second seismic vibrators that are substantially uncorrelated with each other, each of the first and at least a second vibrators imparting energy into subsurface formations for detection after reflection from subsurface features, each of the first and the at least a second seismic vibrator having at least two resonance frequencies in a selected frequency band,
   wherein each of the first and at least a second vibrators comprises:
      a flextensional outer shell,
      a magnetostrictive driver disposed within the outer shell,
      a first spring disposed within the outer shell and in functional contact with the driver, and
      a second spring disposed within the outer shell between the first spring and the outer shell, the second spring in functional contact with the driver and the outer shell, and
   wherein a mass load of the outer shell, a spring constant of the first spring and the second spring, and a mass load on the driver from the first spring are selected to result in the at least two resonance frequencies when the first and at least a second vibrators are disposed in a body of water.

2. The method of claim 1 wherein the driver signal applied to each of the first and the at least a second seismic vibrator comprises a direct sequence spread spectrum code.

3. The method of claim 2 wherein the code comprises at least one of a maximum length sequence, a Gold sequence and a Kasami sequence.

4. The method of claim 1 further comprising detecting seismic signals at a plurality of spaced apart locations and determining portions of the detected seismic signals originating from each of the first and the at least a second seismic vibrator.

5. The method of claim 1 wherein at least one of the first and the at least a second vibrator comprises a plurality of vibrators having different frequency response, and wherein the driver signal used to operate the plurality of vibrators comprises components corresponding to the frequency response of each of the plurality of vibrators.

6. The method of claim 1 wherein each of the vibrators comprises at least two resonance frequencies within a selected frequency range.

7. A method for marine seismic surveying comprising:
   operating a first seismic vibrator in a body of water;
   operating at least a second seismic vibrator in the body of water substantially contemporaneously with the operating the first seismic vibrator, the operating the first and the at least a second seismic vibrators including applying a driver signal to each of the first and the at least a second seismic vibrators that are substantially uncorrelated with each other, each of the first and the at least a second seismic vibrator having at least two resonance frequencies in a selected frequency band,
   wherein each of the first and at least a second vibrators comprises:
      a flextensional outer shell,
      a magnetostrictive driver disposed within the outer shell,
      a first spring disposed within the outer shell and in functional contact with the driver, and
      a second spring disposed within the outer shell between the first spring and the outer shell, the second spring in functional contact with the outer shell and with the driver, and
   wherein a mass load of the outer shell, a spring constant of the first spring and the second spring, and a mass load on the driver from the first spring are selected to result in the at least two resonance frequencies;
   detecting seismic signals at each of a plurality of seismic receivers disposed at spaced apart locations; and determining portions of the detected seismic signals resulting from energy imparted into formations below the bottom of the body of water by each of the first and the at least a second seismic vibrator.

8. The method of claim 7 wherein the driver signal applied to each of the first and the at least a second seismic vibrator comprises a direct sequence spread spectrum code.

9. The method of claim 8 wherein the code comprises at least one of a maximum length sequence, a Gold sequence and a Kasami sequence.

10. The method of claim 7 wherein at least one of the first and the at least a second vibrator comprises a plurality of vibrators having different frequency response, and wherein the driver signal used to operate the plurality of vibrators comprises components corresponding to the frequency response of each of the plurality of vibrators.

* * * * *